United States Patent
Chen et al.

(10) Patent No.: US 11,231,759 B2
(45) Date of Patent: Jan. 25, 2022

(54) POWER PERFORMANCE MANAGEMENT METHOD AND ELECTRONIC DEVICE

(71) Applicant: REALTEK SEMICONDUCTOR CORP., Hsinchu (TW)

(72) Inventors: Chien-Liang Chen, Hsinchu (TW); Chao-Min Lai, Hsinchu (TW); Ming-Tsung Tsai, Hsinchu (TW); Cheng-Yu Lee, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 16/904,050

(22) Filed: Jun. 17, 2020

(65) Prior Publication Data

US 2021/0181822 A1    Jun. 17, 2021

(30) Foreign Application Priority Data

Dec. 11, 2019    (TW) .................. 108145413

(51) Int. Cl.
*G06F 1/00*      (2006.01)
*G06F 1/20*      (2006.01)
(Continued)

(52) U.S. Cl.
CPC .............. *G06F 1/206* (2013.01); *G01K 3/005* (2013.01); *G06F 1/324* (2013.01); *G06F 1/3206* (2013.01); *G06F 1/3287* (2013.01)

(58) Field of Classification Search
CPC ........ G06F 1/206; G06F 1/3206; G06F 1/324; G06F 1/3287; G01K 3/005
See application file for complete search history.

(56) References Cited

U.S. PATENT DOCUMENTS 9,032,125 B2    5/2015   Guddeti et al.
10,009,016 B1 *  6/2018   Ho ............................ G06F 1/10
(Continued)

FOREIGN PATENT DOCUMENTS

CN    136557135 A    4/2017
CN    107102707 A    8/2017
(Continued)

*Primary Examiner* — Nitin C Patel
(74) *Attorney, Agent, or Firm* — Birch, Stewart, Kolasch & Birch, LLP

(57) ABSTRACT

A performance management method and an electronic device are provided. The method is applied to the electronic device with a system processor and includes: sensing a temperature of the electronic device and determining whether the temperature is greater than a first temperature setting value; when the temperature is not greater than the first temperature setting value, initiating a frequency increasing procedure; when the temperature is greater than the first temperature setting value, determining whether the temperature is greater than a second temperature setting value, where the second temperature setting value is greater than the first temperature setting value; when the temperature is greater than the first temperature setting value and is not greater than the second temperature setting value, initiating a first frequency reducing procedure; and when the temperature is greater than the second temperature setting value, initiating a second frequency reducing procedure or turning off the system processor.

12 Claims, 4 Drawing Sheets

(51) Int. Cl.
*G01K 3/00* (2006.01)
*G06F 1/3287* (2019.01)
*G06F 1/324* (2019.01)
*G06F 1/3206* (2019.01)

(56) References Cited

U.S. PATENT DOCUMENTS

| | | | | |
|---|---|---|---|---|
| 2006/0136076 A1* | 6/2006 | Rotem | ............... | G05D 23/1934 700/44 |
| 2008/0005603 A1* | 1/2008 | Buch | ............... | G06F 1/206 713/320 |
| 2016/0147291 A1* | 5/2016 | Thomas | ............... | G06F 1/206 713/320 |
| 2017/0168532 A1* | 6/2017 | Kim | ............... | G06F 1/206 |
| 2019/0094938 A1* | 3/2019 | Tidwell | ............... | G06F 1/329 |

FOREIGN PATENT DOCUMENTS

| | | |
|---|---|---|
| CN | 107340833 A | 11/2017 |
| TW | I650630-8 | 2/2019 |

\* cited by examiner

POWER PERFORMANCE MANAGEMENT METHOD AND ELECTRONIC DEVICE

CROSS-REFERENCE TO RELATED APPLICATION

This non-provisional application claims priority under 35 U.S.C. § 119(a) to Patent Application No. 108145413 in Taiwan, R.O.C. on Dec. 11, 2019, the entire contents of which are hereby incorporated by reference.

BACKGROUND

Technical Field

The present invention relates to power performance management technologies, and in particular, to a performance management method in which an operating frequency is controlled through rapid reduction and slow increase and an electronic device.

Related Art

With the development of integrated circuit technologies, increasing requirements are imposed on functional specifications of integrated circuits, resulting increasingly complex and detailed design of the integrated circuits. Application of a system-on-chip (SOC) based on the circuit design on electronic product is extremely important. When operating at a relatively high frequency, the system-on-chip consumes more power, and correspondingly more heat is generated, resulting in a higher temperature of the system-on-chip. Once there is an excessive temperature, the system-on-chip cannot operate normally, and even an entire system shuts down or is damaged.

In order to prevent the system-on-chip from shutting down or being damaged as a result of an excessive temperature, when a temperature of the system-on-chip exceeds a predetermined temperature, a central processing unit in the system-on-chip is reduced in frequency, to reduce power consumption, and the frequency is increased only after the temperature of the system-on-chip decreases to a predetermined temperature. However, a speed of a frequency-reduced electronic product is significantly lower than an original normal speed of the central processing unit, resulting in a lower computing speed of the electronic product. Consequently, optimal performance cannot be maintained.

SUMMARY

In view of the above, the present invention proposes a performance management method applied to an electronic device with a system processor, including: sensing a temperature of the electronic device, and determining whether the temperature is greater than a first temperature setting value; when the temperature is not greater than the first temperature setting value, initiating a frequency increasing procedure; when the temperature is greater than the first temperature setting value, determining whether the temperature is greater than a second temperature setting value, where the second temperature setting value is greater than the first temperature setting value; when the temperature is greater than the first temperature setting value and is not greater than the second temperature setting value, initiating a first frequency reducing procedure; and when the temperature is greater than the second temperature setting value, initiating a second frequency reducing procedure or turning off the system processor.

The present invention further proposes an electronic device, including a temperature sensor, a system processor, and a control module. The temperature sensor is configured to sense a temperature. The system processor has an operating frequency. The control module is electrically connected to the temperature sensor and the system processor. When the temperature is less than a first temperature setting value, the control module initiates a frequency increasing procedure for the system processor. When the temperature is greater than the first temperature setting value and is not greater than a second temperature setting value, the control module initiates a first frequency reducing procedure for the system processor, where the second temperature setting value is greater than the first temperature setting value. When the temperature is greater than the second temperature setting value, the control module initiates a second frequency reducing procedure or turns off the system processor.

According to some embodiments, the frequency increasing procedure further includes: determining whether the operating frequency of the system processor is a maximum value, and when the operating frequency is not the maximum value, increasing the operating frequency of the system processor by a frequency amount according to a first time interval.

According to some embodiments, the first frequency reducing procedure further includes: reducing the operating frequency of the system processor by a frequency amount.

According to some embodiments, when the first frequency reducing procedure is to be continuously initiated more than two times, there is a second time interval between two adjacent moments at which the first frequency reducing procedure is initiated, and the second time interval is less than the first time interval.

According to some embodiments, when the temperature is greater than the second temperature setting value, the control module first determines whether the operating frequency of the system processor is a minimum value, when the operating frequency is not the minimum value, the control module initiates the second frequency reducing procedure, and when the operating frequency of the system processor is the minimum value, the control module turns off the system processor.

According to some embodiments, the second frequency reducing procedure further includes: reducing the operating frequency of the system processor to the minimum value.

According to some embodiments, the control module regularly determines whether the temperature is greater than the first temperature setting value according to a cycle time, and the cycle time is equal to the second time interval.

According to some embodiments, the electronic device is a system-on-chip.

In summary, in the present invention, when the electronic device has an excessive temperature, and the frequency needs to be reduced to reduce the temperature, the operating frequency of the system processor is adjusted through gradual frequency reduction and frequency increase, to enable the electronic device to be in a best operating state through rapid reduction and slow increase, so that the electronic device can effectively maintain best performance.

DETAILED DESCRIPTION

A performance management method provided in the present invention is used on an electronic device with a system processor, and a frequency of the system processor is increased or reduced using software of a control module to maintain the electronic device to be in an optimal operating state.

Figure 1:
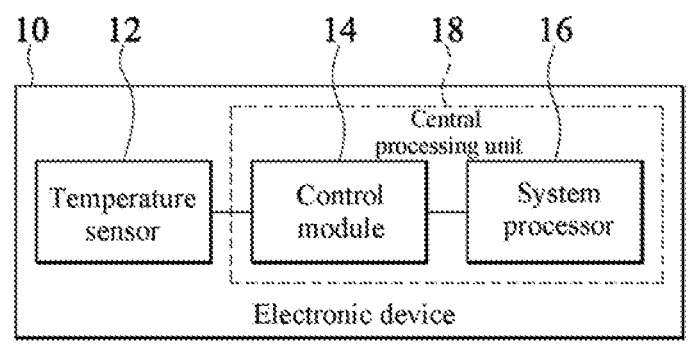
FIG. 1 is a schematic block diagram of an electronic device according to an embodiment of the present invention.

FIG. 1 is a schematic block diagram of an electronic device according to an embodiment of the present invention. Referring to FIG. 1, an electronic device 10 includes a temperature sensor 12, a control module 14, and a system processor 16. In this embodiment, a central processing unit (CPU) 18 includes a control module 14 and a system processor 16. The temperature sensor 12 is configured to sense a temperature of the electronic device 10, especially a high temperature generated when the system processor 16 operates. The system processor 16 has an operating frequency. The control module 14 is electrically connected to the temperature sensor 12 and the system processor 16. The control module 14 continuously receives a temperature sensed by the temperature sensor 12 and determines a corresponding method according to the varied temperature. A first temperature setting value and a second temperature setting value are preset in the control module 14. The second temperature setting value is greater than the first temperature setting value. When the temperature sensed by the temperature sensor 12 is not greater than the first temperature setting value, the control module 14 initiates a frequency increasing procedure for the system processor 16. When the temperature is greater than the first temperature setting value and is not greater than the second temperature setting value, the control module 14 initiates a first frequency reducing procedure for the system processor 16. When the temperature is greater than the first temperature setting value and the second temperature setting value, the control module 14 initiates a second frequency reducing procedure or turns off the system processor 16.

In an embodiment, before the control module 14 turns off the system processor 16, the control module 14 determines whether the operating frequency of the system processor 16 is a minimum value. When the operating frequency of the system processor 16 is not the minimum value, the control module 14 initiates the second frequency reducing procedure. When the operating frequency of the system processor 16 is the minimum value, the control module 14 turns off the system processor 16, to prevent the system processor 16 from shutting down or being damaged as a result of an excessive temperature.

In an embodiment, the electronic device 10 is a system-on-chip (SOC), and the temperature sensor 12, the central processing unit 18 (the control module 14 and the system processor 16), etc. are all integrated in the system-on-chip.

In an embodiment, the first temperature setting value may be set to 100° C., and the second temperature setting value may be set to 120° C., but the present invention is not limited thereto.

Figure 2:
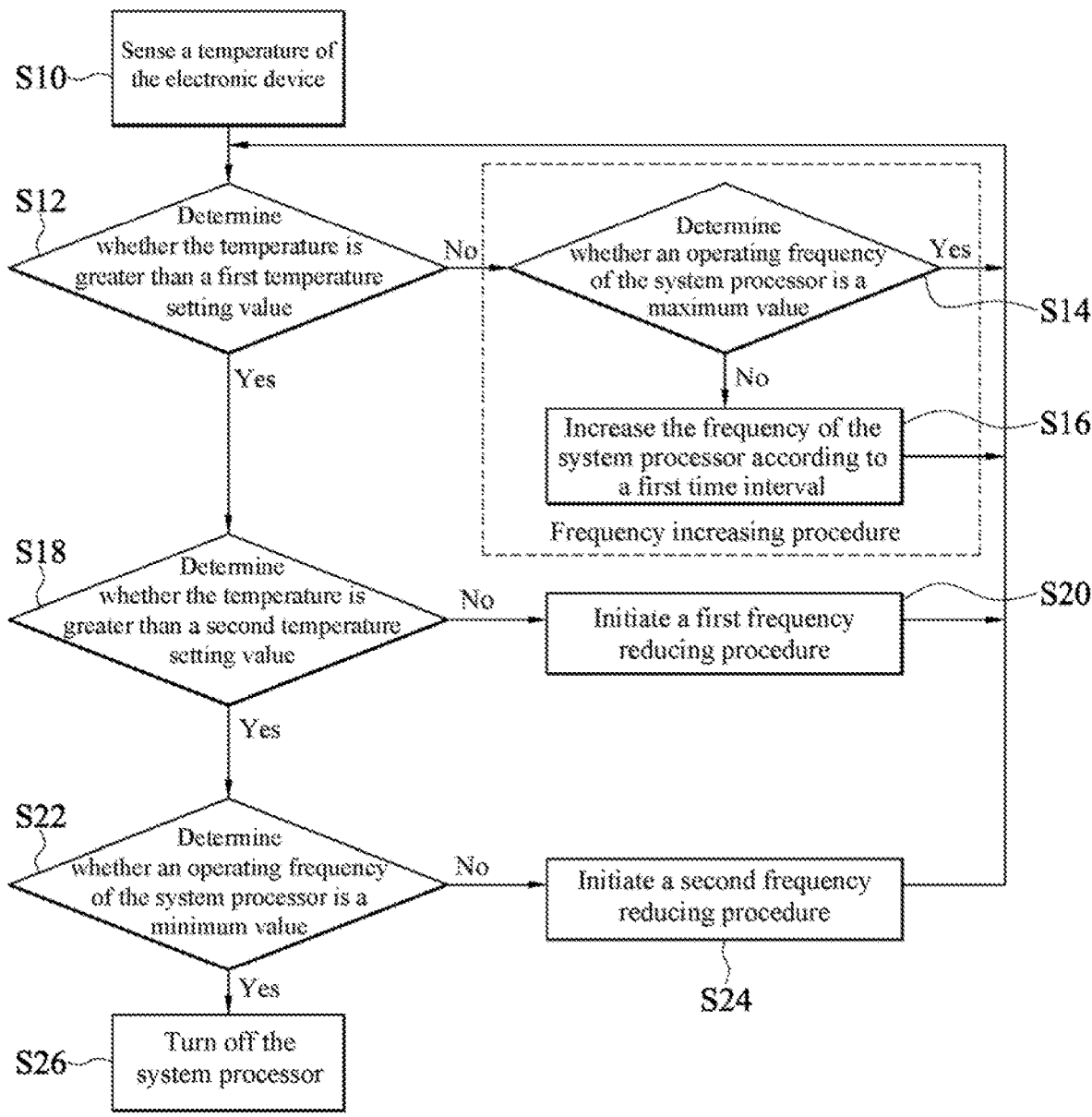
FIG. 2 is schematic flowchart of a performance management method according to an embodiment of the present invention.

FIG. 2 is schematic flowchart of a performance management method according to an embodiment of the present invention. Referring to FIG. 1 and FIG. 2, the performance management method includes steps S10 to S26, and steps S12 to S26 are executed by software of the control module 14 in the central processing unit 18. First, in step S10, the temperature sensor 12 continuously senses the temperature of the electronic device 10 and transmits the sensed temperature to the control module 14.

As shown in step S12, after receiving the temperature sensed by the temperature sensor 12, the control module 14 determines whether the temperature is greater than a first temperature setting value. When the temperature is not greater than the first temperature setting value, the control module 14 initiates a frequency increasing procedure for the system processor 16 (step S14 and step S16). When the temperature is greater than the first temperature setting value, next step S18 is performed. In an embodiment, the control module 14 regularly determines whether the temperature is greater than the first temperature setting value according to a cycle time (for example, 250 ms), so as to determine whether to perform the frequency increasing procedure or step S18 accordingly.

When the frequency increasing procedure is initiated because the temperature is not greater than the first temperature setting value, as shown in step S14, the control module 14 determines whether an operating frequency of the system processor 16 is a maximum value. When the operating frequency of the system processor 16 is the maximum value, the control module 14 performs again the step of determining whether the temperature is greater than the first temperature setting value (returns to step S12). When the control module 14 determines that the operating frequency of the system processor 16 is not the maximum value, the control module may proceed to next step S16. As shown in step S16, the control module 14 increases the frequency of the system processor 16 by a frequency amount according to a first time interval, and then the control module 14 performs again the step of determining whether the temperature is greater than the first temperature setting value (returns to step S12). In an embodiment, the first time interval is one second. When the control module 14 determines that the temperature is not greater than the first temperature setting value and that the operating frequency of the system processor 16 is not the maximum value, the control module 14 increases the operating frequency of the system processor 16 by a frequency amount after waiting for the first time interval of one second. If the control module 14 determines again that the temperature is not greater than the first temperature setting value and that the operating frequency of the system processor 16 is not the maximum value, the control module 14 increases the operating frequency of the system processor 16 by a frequency amount every first time interval of one second until the control module 14 determines other steps to be performed.

When the temperature is greater than the first temperature setting value, as shown in step S18, the control module 14 continues determining whether the temperature is greater than the second temperature setting value. When the temperature is greater than the first temperature setting value and is not greater than the second temperature setting value, as shown in step S20, the control module 14 initiates a first frequency reducing procedure for the system processor 16.

When the temperature is greater than the second temperature setting value, step S22 is performed to further determine whether to initiate a second frequency reducing procedure or shut down the system processor 16.

In step S20, the first frequency reducing procedure further includes: reducing, by the control module 14, the operating frequency of the system processor 16 by a frequency amount. In an embodiment, if the first frequency reducing procedure is to be continuously initiated more than two times, there is a second time interval between two adjacent moments at which the first frequency reducing procedure is initiated. The second time interval is less than the first time interval, and the second time interval is equal to the foregoing cycle time. For example, the second time interval is 250 milliseconds (ms). When the temperature is greater than the first temperature setting value and is less than the second temperature setting value, the control module 14 reduces the operating frequency of the system processor 16 by a frequency amount every 250 ms until the control module 14 determines other steps to be performed.

When the control module 14 determines that the temperature is greater than the second temperature setting value, as shown in step S22, the control module 14 further determines whether the operating frequency of the system processor 16 is the minimum value. When the operating frequency of the system processor 16 is not the minimum value, as shown in step S24, the control module 14 initiates the second frequency reducing procedure for the system processor 16, so that the control module 14 directly reduces the operating frequency of the system processor 16 to the minimum value, and then the control module 14 performs again the step of determining whether the temperature is greater than the first temperature setting value (returns to step S12) to further determine whether the temperature of the electronic device 10 decreases. When the operating frequency of the system processor 16 is the minimum value, as shown in step S26, the control module 14 may directly turn off the system processor 16 to prevent the system processor 16 from shutting down or being damaged as a result of an excessive temperature.

In an embodiment, when the control module 14 determines that the temperature is greater than the second temperature setting value in step S18, the performance management method may also omit steps S22 and S24, and directly proceed to step S26 to shut down the system processor 16.

Figure 3:
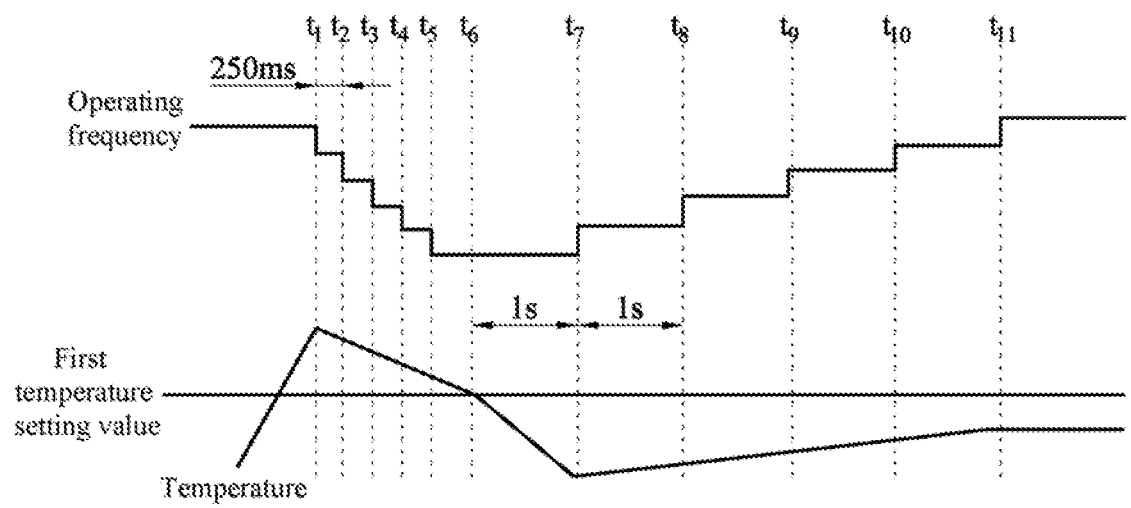
FIG. 3 is schematic diagram of a curve between an operating frequency and a temperature according to an embodiment of the present invention.

FIG. 3 is a schematic diagram of a curve between an operating frequency and a temperature according to an embodiment of the present invention. Referring to FIG. 1 and FIG. 3, at a time point $t_1$, the temperature is greater than the first temperature setting value and is not greater than the second temperature setting value. In this case, the control module 14 reduces the operating frequency of the system processor 16 by a frequency amount. After 250 ms (the second time interval), the temperature at a time point $t_2$ is still greater than the first temperature setting value, and therefore the control module 14 reduces again the operating frequency of the system processor 16 by a frequency amount and continuously determines whether the temperature is greater than the first temperature setting value. Therefore, the frequency is reduced once at each of time points $t_1$, $t_2$, $t_3$, $t_4$, and is with an interval of 250 ms to reach the minimum value of the operating frequency. At a time point $t_6$, the temperature starts to be less than the first temperature setting value, and therefore the control module 14 increases the operating frequency of the system processor 16 by a frequency amount after waiting for is (the first time interval). In addition, the temperature maintains to be less than the first temperature setting value at time points $t_7$, $t_8$, $t_9$, $t_{10}$, and $t_{11}$, and therefore the operating frequency of the system processor 16 is gradually increased by a frequency amount every 1 s to reach the maximum value of the operating frequency (after the time point $t_6$, the temperature is always not greater than the first temperature setting value).

Figure 4:
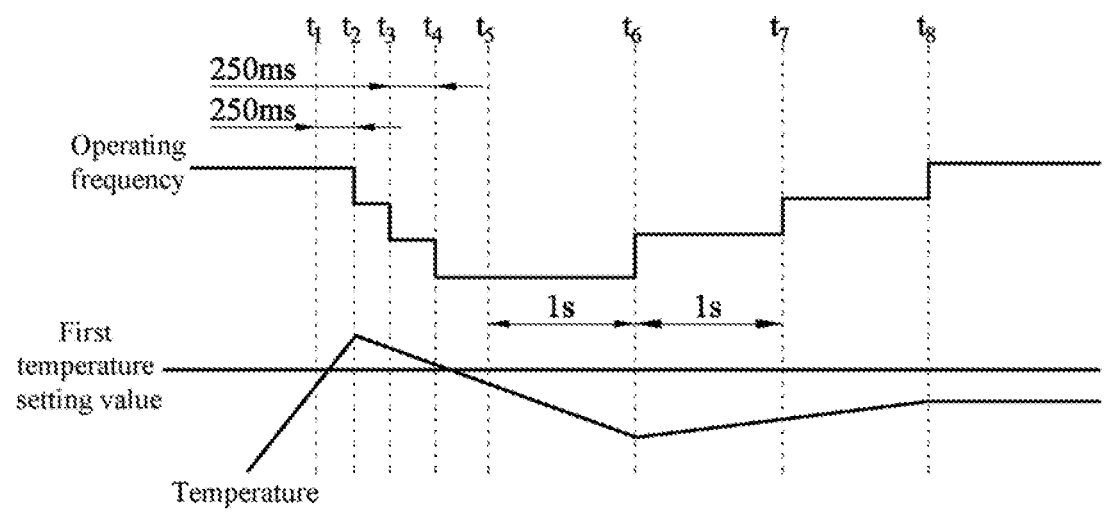
FIG. 4 is a schematic diagram of a curve between an operating frequency and a temperature according to another embodiment of the present invention.

FIG. 4 is a schematic diagram of a curve between an operating frequency and a temperature according to another embodiment of the present invention. Referring to FIG. 1 and FIG. 4, when the temperature is less than the first temperature setting value, during waiting of frequency increase in the first time interval, it is determined whether the temperature is greater than the first temperature setting value according to the cycle time. If yes, the frequency is reduced first. Therefore, at the time point $t_1$, although the temperature is less than the first temperature setting value, the temperature changes only after 250 ms (the cycle time) during waiting of 1 s (the first time interval), and the temperature at the time point $t_2$ is greater than the first temperature setting value (not greater than the second temperature setting value). In this case, at the point time $t_2$, the control module 14 directly reduces the operating frequency of the system processor 16 by a frequency amount. In addition, after each 250 ms (second time interval), the temperatures at the time points $t_3$ and $t_4$ are still greater than the first temperature setting value. Therefore, the operating frequency of the system processor 16 is gradually reduced by a frequency amount and it is continuously determined whether the temperature is greater than the first temperature setting value. At the time point $t_5$, the temperature starts to be less than the first temperature setting value, and therefore the control module 14 increases the operating frequency of the system processor 16 by a frequency amount after waiting for 1 s (the first time interval). In addition, since the temperatures at the time points $t_6$, $t_7$, and $t_8$ maintain to be less than the first temperature setting value, the operating frequency of the system processor 16 is increased by a frequency amount every 1 s to reach the maximum value of the operating frequency (after the time point $t_5$, the temperature is always not greater than the first temperature setting value).

Figure 5:
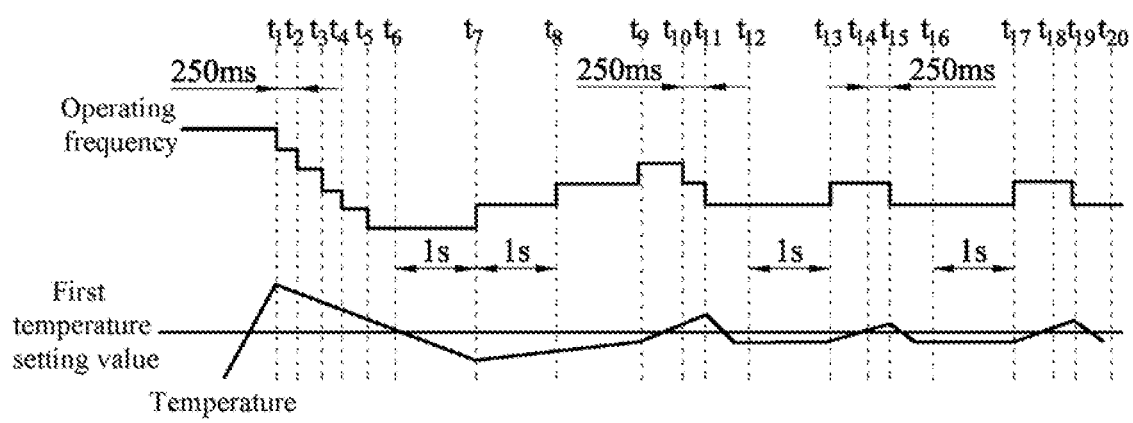
FIG. 5 is a schematic diagram of a curve between an operating frequency and a temperature according to still another embodiment of the present invention.

FIG. 5 is a schematic diagram of a curve between an operating frequency and a temperature according to still another embodiment of the present invention. Referring to FIG. 1 and FIG. 5, at a time point $t_1$, the temperature is greater than the first temperature setting value and is not greater than the second temperature setting value. In this case, the control module 14 reduces the operating frequency of the system processor 16 by a frequency amount. After 250 ms (the second time interval), the temperature at a time point $t_2$ is still greater than the first temperature setting value, and therefore the control module reduces the operating frequency of the system processor 16 by a frequency amount and continuously determines whether the temperature is greater than the first temperature setting value. Therefore, the frequency is reduced once at each of time points $t_1$, $t_2$, $t_3$, $t_4$ and $t_5$ with an interval of 250 ms. At a time point $t_6$, the temperature starts to be less than the first temperature setting value, and therefore the control module 14 increases the operating frequency of the system processor 16 by a frequency amount after waiting for 1 s (the first time interval). In addition, since the temperature maintains to be less than the first temperature setting value at time points $t_7$, $t_8$, and $t_9$, the operating frequency of the system processor 16 is gradually increased by a frequency amount every 1 s. However, before the operating frequency reaches the maximum value of the operating frequency, the temperature is greater than the first temperature setting value again at the time points $t_{10}$ and $t_{11}$, and therefore the operating frequency is gradually reduced. The temperature is less than the first temperature setting value again at a time point $t_{12}$, and therefore the control module 14 increases the operating frequency again, and so on. During a period from time points $t_{13}$ to $t_{20}$, the operating frequency of the system processor 16 maintains to be approximately the first temperature setting value through frequency adjustment of the control module 14, so that current maximum performance of the system processor 16 can be achieved.

In the present invention, when the electronic device 10 has an excessive temperature, the frequency is rapidly reduced to achieve secure use of the system processor 16. When the temperature does not reach the first temperature setting value, the frequency is slowly increased to achieve performance of the system processor 16. The control module 14 sets a high threshold temperature based on the first temperature setting value, so that the system processor 16 does not exceed the first temperature setting value. If the system processor exceeds the first temperature setting value, the frequency is reduced to reduce the temperature. If the temperature does not decrease but continues increasing, the control module 14 may determine to turn off the system processor 16 according to the second temperature setting value.

Therefore, when the electronic device has an excessive temperature, the frequency needs to be reduced to reduce the temperature. In the present invention, the operating frequency of the system processor is adjusted through gradual frequency reduction and frequency increase, to enable the electronic device to be in a best operating state through rapid reduction and slow increase, so that the electronic device can effectively maintain best performance.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A performance management method applied to an electronic device with a system processor, comprising:
    sensing a temperature of the electronic device;
    determining whether the temperature is greater than a first temperature setting value;
    when the temperature is not greater than the first temperature setting value, initiating a frequency increasing procedure;
    when the temperature is greater than the first temperature setting value, determining whether the temperature is greater than a second temperature setting value, wherein the second temperature setting value is greater than the first temperature setting value;
    when the temperature is greater than the first temperature setting value and is not greater than the second temperature setting value, initiating a first frequency reducing procedure; and
    when the temperature is greater than the second temperature setting value, initiating a second frequency reducing procedure or turning off the system processor;
    wherein the frequency increasing procedure further comprises: determining whether an operating frequency of the system processor is a maximum value; and when the operating frequency is not the maximum value, increasing the operating frequency of the system processor by a frequency amount according to a first time interval; and
    wherein when the first frequency reducing procedure is to be continuously initiated more than two times, there is a second time interval between two adjacent moments at which the first frequency reducing procedure is initiated, wherein the second time interval is less than the first time interval.

2. The performance management method according to claim 1, wherein the first frequency reducing procedure further comprises: reducing the operating frequency of the system processor by the frequency amount.

3. The performance management method according to claim 1, further comprising:
    when the temperature is greater than the second temperature setting value, determining whether an operating frequency of the system processor is a minimum value;
    when the operating frequency of the system processor is not the minimum value, initiating the second frequency reducing procedure; and
    when the operating frequency of the system processor is the minimum value, turning off the system processor.

4. The performance management method according to claim 3, wherein the second frequency reducing procedure further comprises: reducing the operating frequency of the system processor to the minimum value.

5. The performance management method according to claim 1, wherein the step of determining whether the temperature is greater than the first temperature setting value is regularly performed according to a cycle time, and the cycle time is equal to the second time interval.

6. The performance management method according to claim 1, wherein the electronic device is a system-on-chip.

7. An electronic device, comprising:
    a temperature sensor configured to sense a temperature;
    a system processor with an operating frequency; and
    a control module electrically connected to the temperature sensor and the system processor, wherein when the temperature is less than a first temperature setting value, the control module initiates a frequency increasing procedure for the system processor; when the temperature is greater than the first temperature setting value and is not greater than a second temperature setting value, the control module initiates a first frequency reducing procedure for the system processor, wherein the second temperature setting value is greater than the first temperature setting value; and when the temperature is greater than the second temperature setting value, the control module initiates a second frequency reducing procedure or turns off the system processor;
    wherein the frequency increasing procedure further comprises: the control module determines whether the operating frequency of the system processor is a maximum value, and when the operating frequency is not the maximum value, the control module increases the operating frequency of the system processor by a frequency amount according to a first time interval; and
    wherein when the first frequency reducing procedure is to be continuously initiated more than two times, there is a second time interval between two adjacent moments at which the first frequency reducing procedure is initiated, wherein the second time interval is less than the first time interval.

8. The electronic device according to claim 7, wherein the first frequency reducing procedure further comprises: the control module reduces the operating frequency of the system processor by the frequency amount.

9. The electronic device according to claim 7, wherein when the temperature is greater than the second temperature setting value, the control module first determines whether the operating frequency of the system processor is a minimum value, and when the operating frequency is not the minimum value, the control module initiates the second frequency reducing procedure; and when the operating frequency of the system processor is the minimum value, the control module turns off the system processor.

10. The electronic device according to claim 9, wherein the second frequency reducing procedure further comprises: the control module reduces the operating frequency of the system processor to the minimum value.

11. The electronic device according to claim 7, wherein the control module regularly determines whether the temperature is greater than the first temperature setting value according to a cycle time, and the cycle time is equal to the second time interval.

12. The electronic device according to claim 7, wherein the electronic device is a system-on-chip.

* * * * *